United States Patent
Chen et al.

(10) Patent No.: US 7,408,333 B2
(45) Date of Patent: Aug. 5, 2008

(54) POWER SUPPLY APPARATUS

(75) Inventors: Ke-Horng Chen, Banciao (TW); Li-Ren Huang, Yonghe (TW); Hong-Wei Huang, Fongyuan (TW); Sy-Yen Kuo, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 247 days.

(21) Appl. No.: 11/444,570

(22) Filed: May 31, 2006

(65) Prior Publication Data
US 2007/0257647 A1 Nov. 8, 2007

(30) Foreign Application Priority Data
Apr. 24, 2006 (TW) .............................. 95114514 A

(51) Int. Cl.
*G05F 1/565* (2006.01)
(52) U.S. Cl. ...................................................... 323/282
(58) Field of Classification Search ................. 323/265, 323/273, 280, 282, 283, 284, 288, 351

See application file for complete search history.

(56) References Cited

U.S. PATENT DOCUMENTS

| 6,784,647 B2 * | 8/2004 | Nguyen et al. ............... 323/282 |
| 7,292,015 B2 * | 11/2007 | Oswald et al. ............... 323/268 |
| 2006/0043951 A1 * | 3/2006 | Oswald et al. ............... 323/282 |

OTHER PUBLICATIONS

Cheung Fai Lee et al., "A monolithic Current-Mode CMOS DC-DC Converter With On-Chip Current-Sensing Technique" IEEE Journal of Solid-State Circuits, vol. 39, No. 1, Jan. 2004, pp. 3-14.

* cited by examiner

Primary Examiner—Adolf Berhane
(74) Attorney, Agent, or Firm—J.C. Patents

(57) ABSTRACT

A power supply apparatus for supplying an output voltage to a load is provided, which comprises a power output unit, a feedback unit and a control unit. The power output unit adjusts and supplies the output voltage to the load in accordance with at least one driving signal. The feedback unit dynamically detects output condition of the power output unit and outputs the corresponding detection result. The control unit determines a skipping ratio for an internal clock in accordance with the detection result output from the feedback unit, and outputs the internal clock with a part of the pulses being skipped to act as the driving signal.

17 Claims, 12 Drawing Sheets

1

POWER SUPPLY APPARATUS

CROSS-REFERENCE TO RELATED APPLICATION

This application claims the priority benefit of Taiwan application serial no. 95114514, filed on Apr. 24, 2006. All disclosure of the Taiwan application is incorporated herein by reference.

BACKGROUND OF THE INVENTION

1. Field of Invention

The present invention relates to a power supply apparatus, and more particularly, to a power supply apparatus that performs a dynamic pulse-skipping mode (PSM).

2. Description of Related Art

The design of a conventional power supply apparatus is generally based on the specification provided by a manufacturer of load units, so the output power is a preset value, and the output power must be large enough to allow the load to work normally in any case, i.e., the output power is the maximum value of the power consumed by the load. Considering the actual application, the load, such as a processor, a random access memory, and a display, is not fully loaded at any time, especially in the case of a mobile communication product that is mostly in a standby mode to save power, so the efficiency for the power supply apparatus in the whole load range is a key point in practical application. Accordingly, in recent years, a variety of power supply apparatuses are proposed in some documents. For example, in Journal of Solid-State Circuit, Vol. 39, No. 1, Page 3-14, January 2004, in the Institute of Electrical and Electronic Engineers (IEEE), a power supply apparatus is provided, wherein the output state of the power supply apparatus is sensed through a current mode, and thereby the output is adjusted accordingly.

The conventional voltage-regulating method includes: pulse-width modulation (PWM) and pulse-frequency modulation (PFM). FIG. 1 shows the relationship between the conversion efficiency and the load currents for the PWM and PFM. Referring to FIG. 1, as for power supply with light load, the power supply apparatus is designed to regulate voltage through PFM; on the contrary, as for power supply with heavy load, the power supply apparatus is designed to regulate voltage through PWM. FIG. 2 is a circuit diagram of a detector for determining the PWM or PFM in the conventional power supply apparatus. Referring to FIG. 2, according to a comparative result output by a comparator 215, a switch 230 selects to transmit a pulse-width modulation signal output by a pulse-width modulator 205 or a pulse-frequency modulation signal output by a pulse-frequency modulator 210 to drivers 220 and 225. Power transistors 235 and 240 are respectively driven by the drivers 220 and 225 to be alternately turned on. Therefore, a load current $I_{out}$ flows through an inductor 245 to be supplied to a load 270. Generally, all outputs of the power supply apparatus are connected to a load capacitor 250.

Since the voltage-regulating methods of the pulse-width modulation and the pulse-frequency modulation have their own suitable load ranges, the perfect conversion efficiency cannot always be achieved within the whole load range if a single method is employed. Therefore, in the conventional art, the pulse-width modulation and the pulse-frequency modulation are integrated into a single power supply apparatus, which is switched to one of the voltage regulating methods automatically according to the load condition. However, as shown in FIG. 1, there are also low efficiency points at the handshaking section of the curves PFM and PWM.

In order to detect the current of the load 270, a sensitive resistor is connected in series between the power transistor 235 and a voltage source $V_{in}$ in the conventional art. In order to reduce the power consumption, the switching technology (shown in FIG. 2) for the conventional pulse-width modulation and pulse-frequency modulation is to connect a sensitive resistor 255 and a power transistor 260 between a node 280 and the voltage source $V_{in}$ in series. The current load current $I_{out}$ is obtained by using the sensitive resistor 255, and the voltage of a node 285 is compared with a predetermined reference voltage $V_{mode}$, thereby achieving a simple load-sensing architecture. However, the conventional art has two serious disadvantages: (1) power consumption of the serial-connected resistor 255; (2) such architecture is only capable of switching between the pulse-width modulation and the pulse-frequency modulation by using a fixed point, and cannot detect them dynamically.

SUMMARY OF THE INVENTION

An object of the present invention is to provide a power supply apparatus to perform the voltage-regulating operation in dynamic pulse-skipping mode. In the embodiments of the present invention, the load-detection technology is used to integrate three different voltage-regulating methods, namely, the pulse-skipping mode, the pulse-width modulation (PWM) mode, and the pulse-frequency modulation (PFM) mode together, such that the most preferred conversion efficiency is achieved for the load in any case.

Based on the aforementioned object, the present invention provides a power supply apparatus for supplying an output voltage to the load. The power supply apparatus comprises a power output unit, a feedback unit and a control unit. The power output unit adjusts and supplies the output voltage to the load in accordance with at least one driving signal. The feedback unit dynamically detects output condition of the power output unit and outputs the corresponding detection result. The control unit determines a skipping ratio for an internal clock in accordance with the detection result output from the feedback unit, and outputs an internal clock as the driving signal after a part of pulses have been skipped, wherein the skipping ratio is dynamically adjusted as the load is changed.

In the power supply apparatus according to a preferred embodiment of the present invention, the control unit further selects to output the internal clock without being skipped as the aforementioned driving signal in accordance with the detection result output by the feedback unit, wherein the control unit generates the aforementioned internal clock signal through the pulse-width modulation according to the detection result output by the feedback unit. In the power supply apparatus according to a preferred embodiment of the present invention, the control unit further selects to output a second internal clock as the driving signal in accordance with the detection result output by the feedback unit, wherein the control unit generates the second internal clock through the pulse-frequency modulation according to the detection result output by the feedback unit.

Since the voltage-regulating operation in dynamic pulse-skipping mode is employed in the present invention, and even the three voltage-regulating modes of the pulse-skipping mode, the pulse-width modulation mode, and the pulse-frequency modulation mode are integrated together, the most preferred conversion efficiency may always be achieved in the whole load range in any case. Additionally, the present invention further discloses utilizing the delay technology to detect the output condition, thereby avoiding the disadvantage in the conventional art that unnecessary power is consumed on the serial-connected resistor.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Considering from the aspect of the application, the load (such as a processor, a random access memory, or a display) is not fully loaded at any instant, especially in the case of a mobile communication product that is mostly in a standby mode to save power. Therefore, in the practical application, how to make the power supply apparatus keep the highest efficiency in the whole load range is very important. In order to facilitate the illustration, the following embodiments only take a buck converter as an example to enumerate the embodiments of the power supply apparatus of the present invention. Those skilled in the art may apply the embodiments of the present invention in other types of power supply apparatuses according to the spirit of the present invention.

Figure 1:
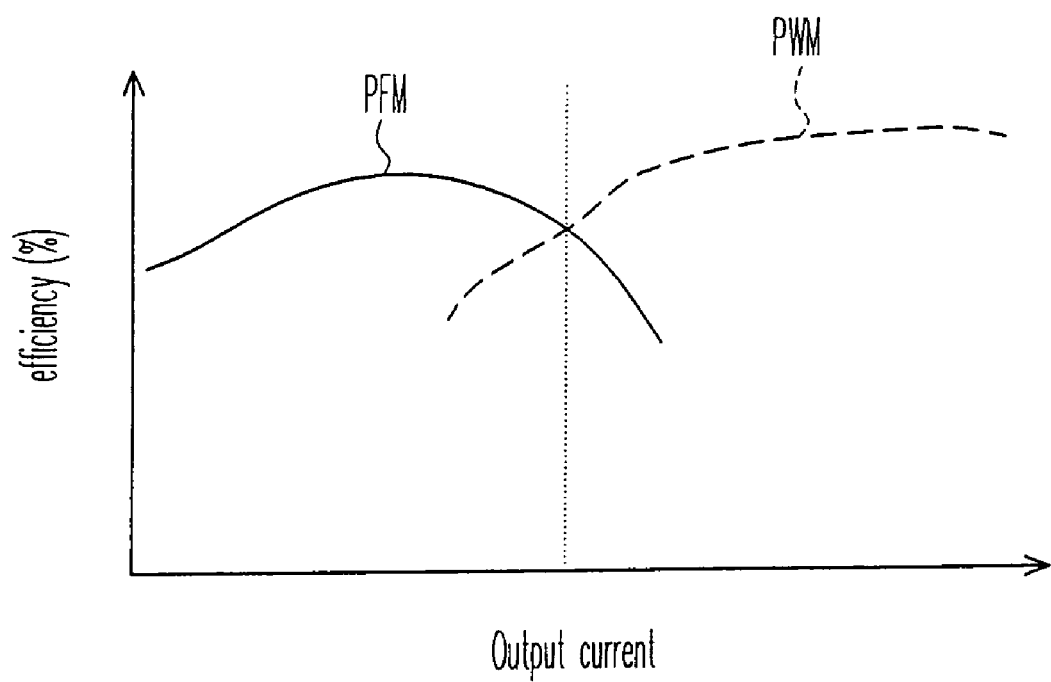
FIG. 1 is the relationship between the conversion efficiency and the output currents in the pulse-width modulation and the pulse-frequency modulation.
Figure 2:
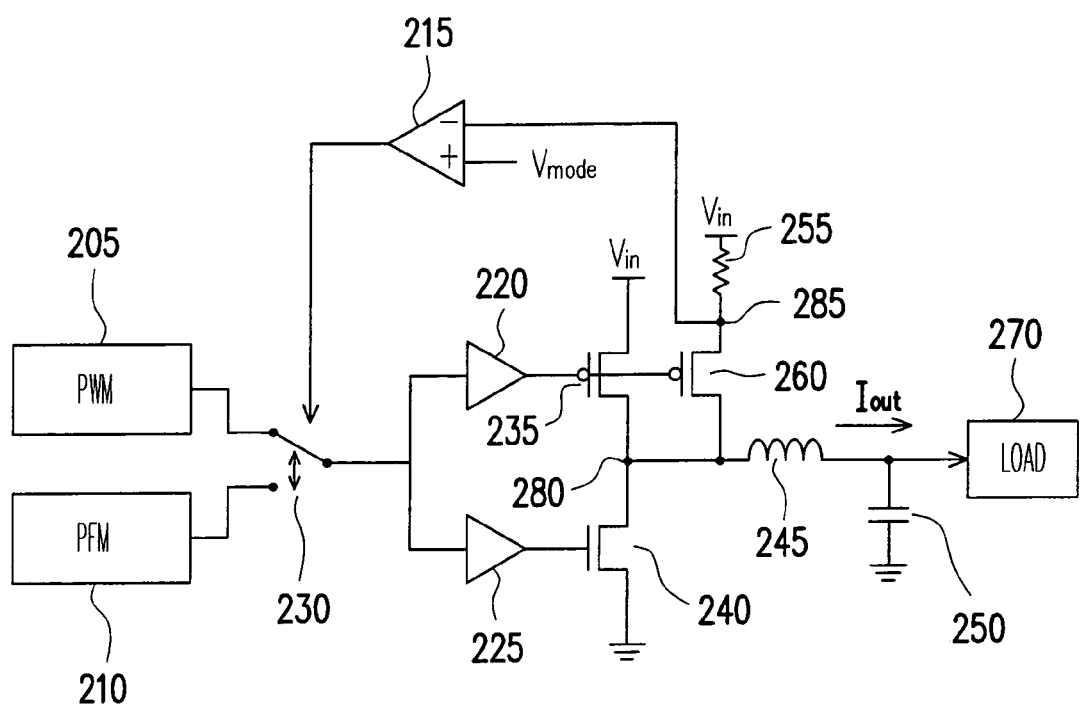
FIG. 2 is a circuit diagram of a detector which determines the pulse-width modulation or pulse-frequency modulation in the conventional power supply apparatus.
Figure 3:
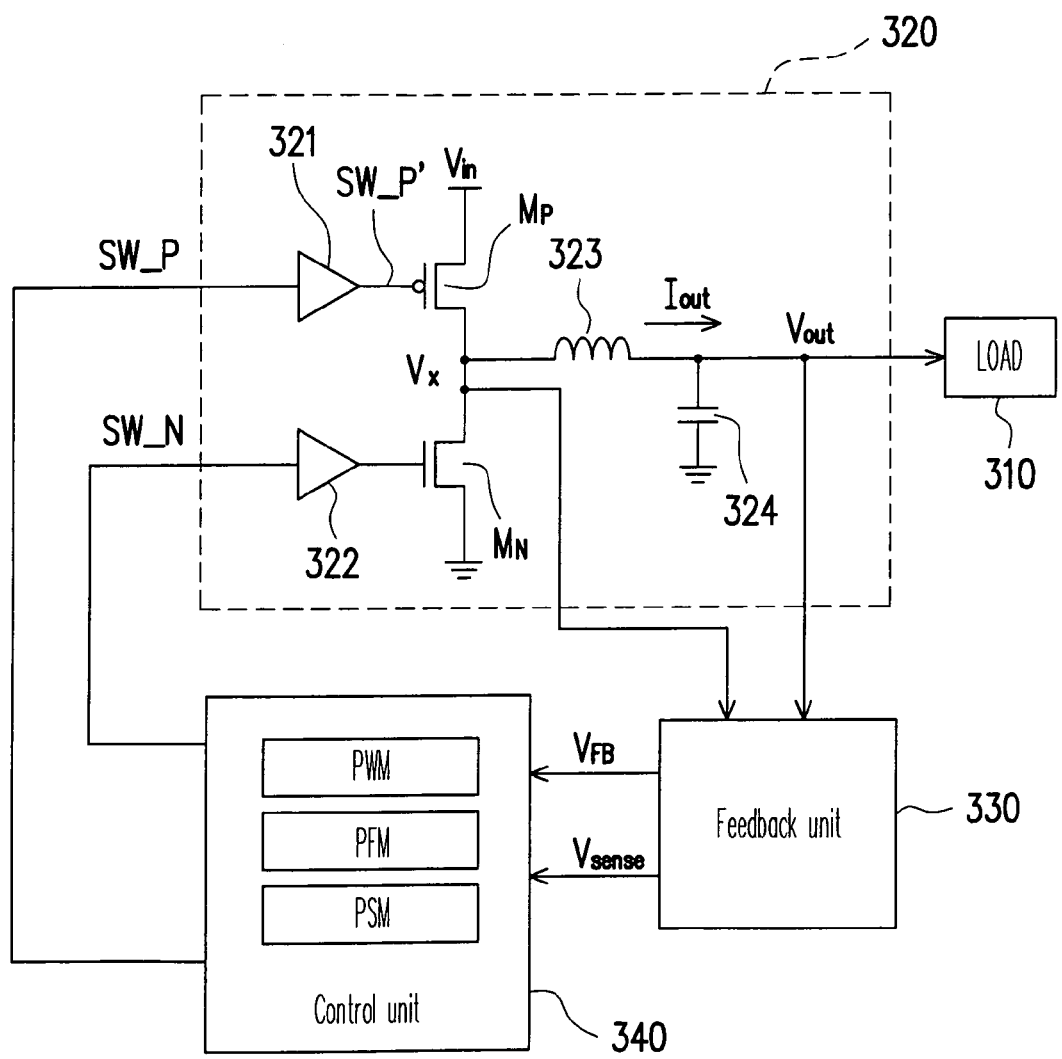
FIG. 3 is a circuit diagram of a three-mode power supply apparatus according to one embodiment of the present invention.

FIG. 3 is a circuit diagram of a three-mode power supply apparatus according to one embodiment of the present invention. Referring to FIG. 3, the power supply apparatus supplies an output voltage $V_{out}$ to a load 310. The power supply apparatus comprises a power output unit 320, a feedback unit 330 and a control unit 340. The power output unit 320 is electrically connected to the load 310, so as to adjust and supply the output voltage $V_{out}$ to the load 310 according to at least one driving signal, wherein the driving signal includes signals SW_P and SW_N in this embodiment. The feedback unit 330 is electrically connected to the power output unit 320. The feedback unit 330 detects the output state of the power output unit 320 and outputs the corresponding detection result, wherein the detection result includes a voltage detection signal $V_{FB}$ and a current detection signal $V_{sense}$ in this embodiment. The control unit 340 is electrically connected to the feedback unit 330 and the power output unit 320. In this embodiment, the three different voltage-regulating methods, namely, the pulse-skipping mode (PSM), the pulse-width modulation (PWM) mode and the pulse-frequency modulation (PFM) mode, are integrated in the control unit 340. The control unit 340 senses the output state of the power output unit 320 through the feedback unit 330, so as to select one mode from the three modes, namely, the pulse-skipping mode, the pulse-width modulation mode, and the pulse-frequency modulation mode accordingly, thereby controlling the power output unit 320.

As for the pulse-skipping mode, a part of the pulse of an internal clock of the control unit 340 is skipped and then the skipped internal clock is output as the driving signal, thereby controlling the output of the power output unit 320. The control unit 340 determines the skipping ratio of the internal clock according to the detection result output by the feedback unit 330, and the skipping ratio is dynamically adjusted as the load is changed. In this embodiment, the pulse-width modulation mode and the pulse-frequency modulation mode can be implemented through the prior art, so they will not be described herein any more.

In this embodiment, a buck converter is used to realize the power output unit 320 and comprises a first switch $M_P$, a second switch $M_N$, an induction coil (here is an inductor 323) and a load capacitor 324. The switches $M_P$ and $M_N$ may be implemented with the power transistors. The control ends of the switches $M_P$ and $M_N$ are electrically connected to the drivers 321 and 322, respectively, and controlled by the control unit 340. The first end of the switch $M_P$ is electrically connected to a voltage source $V_{in}$, wherein $V_x$ represents the voltage of the second end of the switch $M_P$. The first end of the switch $M_N$ is electrically connected to the second end of the switch $M_P$, and the second end of the switch $M_N$ is grounded. The first end of the inductor 323 is electrically connected to the second end of the switch $M_P$, and the second end of the inductor 323 supplies the output voltage $V_{out}$. The first end of the load capacitor 324 is electrically connected to the second end of the inductor 323, and the second end of the load capacitor 324 is grounded.

Figure 4:
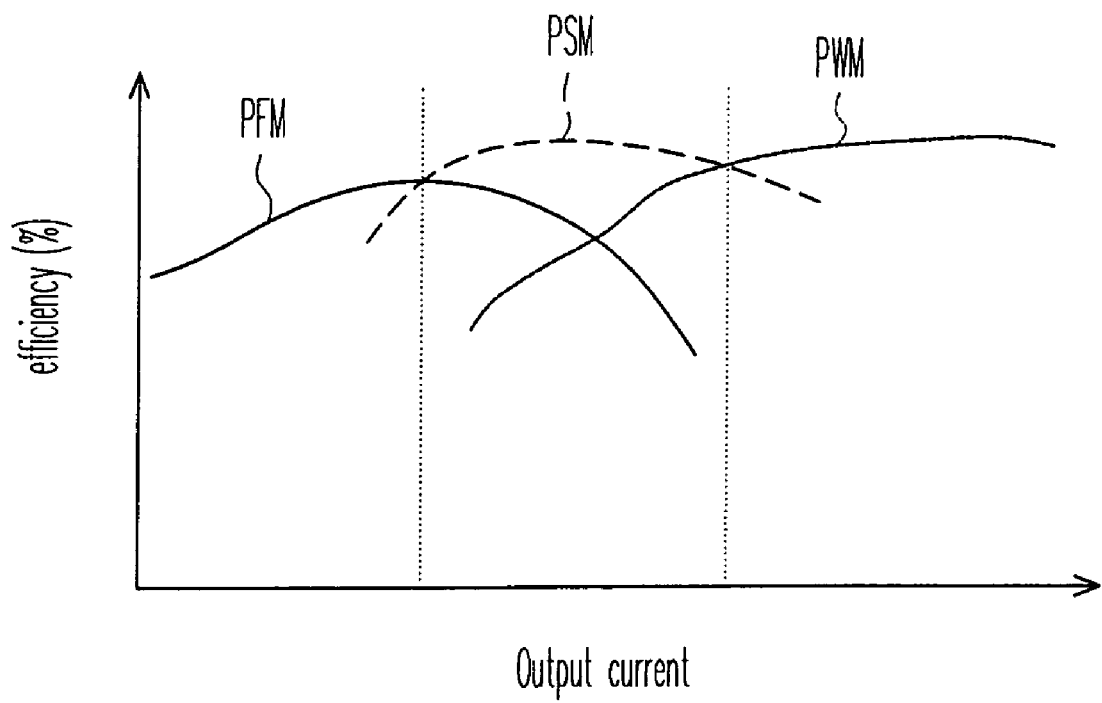
FIG. 4 is the relationship between the conversion efficiency and the output currents in the pulse-skipping mode, the pulse-width modulation, and the pulse-frequency modulation, according to the embodiment of the present invention.

FIG. 4 shows the relationship between the conversion efficiency and the output currents $I_{out}$ of the three modes, namely, the pulse-skipping mode, the pulse-width modulation, and the pulse-frequency modulation, according to the embodiment of the present invention. The curves PFM, PSM and PWM in FIG. 4 respectively represent the characteristic curves of the three modes, namely, the pulse-frequency modulation mode, the pulse-skipping modulation mode, and the pulse-width modulation mode. Referring to FIGS. 3 and 4 together, since every voltage-regulating mode has its own suitable load range, the control unit 340 detects the load through the feedback unit 330, and selects and switches to one mode from the three modes accordingly. As such, the union of the curves of the optimal conversion efficiency of each control mode is achieved, as shown in FIG. 4. The control unit 340 selects one mode from the pulse-skipping mode, the pulse-width modulation mode and the pulse-frequency modulation mode according to the load state, so as to generate and output the driving signals SW_P and SW_N to the drivers 321 and 322. The switches $M_P$ and $M_N$ are driven by the drivers 321 and 322, respectively, to be turned on and off alternately. The output current $I_{out}$ flows through the induction coil to be supplied to the load 310.

Figure 5:
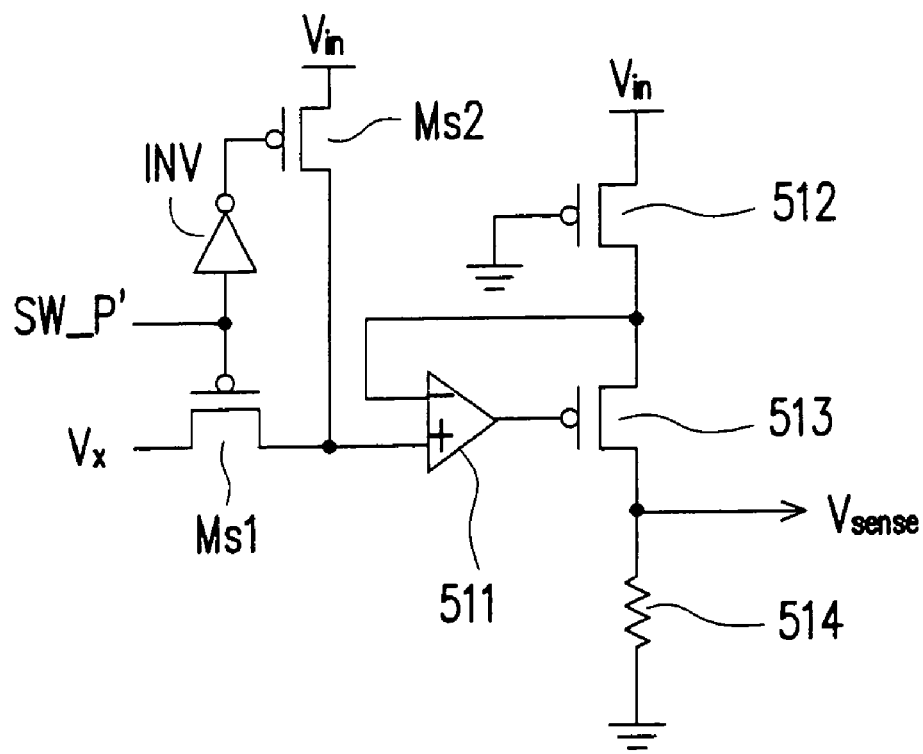
FIG. 5 is a circuit diagram of the feedback unit in FIG. 3 according to one embodiment of the present invention.
Figure 5:
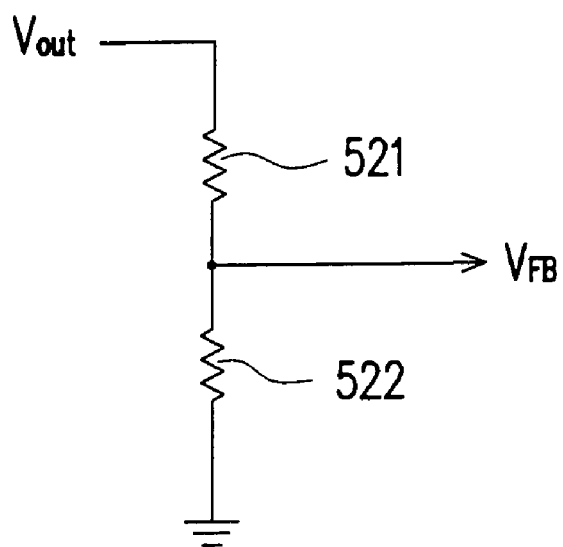

FIG. 5 is a circuit diagram of the feedback unit 330 in FIG. 3 according to one embodiment of the present invention. Referring to FIGS. 3 and 5 together, in the embodiment, the feedback unit comprises an operational amplifier 511, a thirteenth transistor Ms1, a fourteenth transistor Ms2, an NOT gate INV, a fifteenth transistor 512, a sixteenth transistor 513, a first resistor 514, a second resistor 521 and a third resistor 522. The input end of the NOT gate INV is electrically connected to the control end of the first switch $M_P$ to receive a signal SW_P', while the output end is electrically connected to the gate of the fourteenth transistor Ms2. The gate of the P-type transistor Ms1 is electrically connected to the control end of the first switch $M_P$, to receive the signal SW_P', and the source of the transistor Ms1 is electrically connected to the second end of the first switch $M_P$ to receive the voltage Vx. The source of the P-type transistor Ms2 is electrically connected to the voltage source $V_{in}$, and the drain thereof is electrically connected to the drain of the transistor Ms1. The first input end (here is a positive input end) of the operational amplifier 511 is electrically connected to the drain of the transistor Ms1, while the second input end (here is a negative input end) and the output end of the operational amplifier 511 are electrically connected to the source and gate of the transistor 513, respectively. The source of the P-type transistor 512 is electrically connected to the voltage source $V_{in}$, and the gate thereof is grounded. The source of the P-type transistor 513 is electrically connected to the drain of the transistor 512 and the drain level of the transistor 513 is the current detection signal $V_{sense}$ output by the feedback unit 330. The first end of the first resistor 514 is electrically connected to the drain of the transistor 513, and the second end of the resistor 514 is grounded. The first end of the second resistor 521 is electrically connected to the output of the power output unit 320 to receive the output voltage $V_{out}$. The level of the second end of the resistor 521 is the voltage detection signal $V_{FB}$ output by the feedback unit 330. The first end of the third resistor 522 is electrically connected to the second end of the resistor 521, and the second end of the resistor 522 is grounded.

Figure 6:
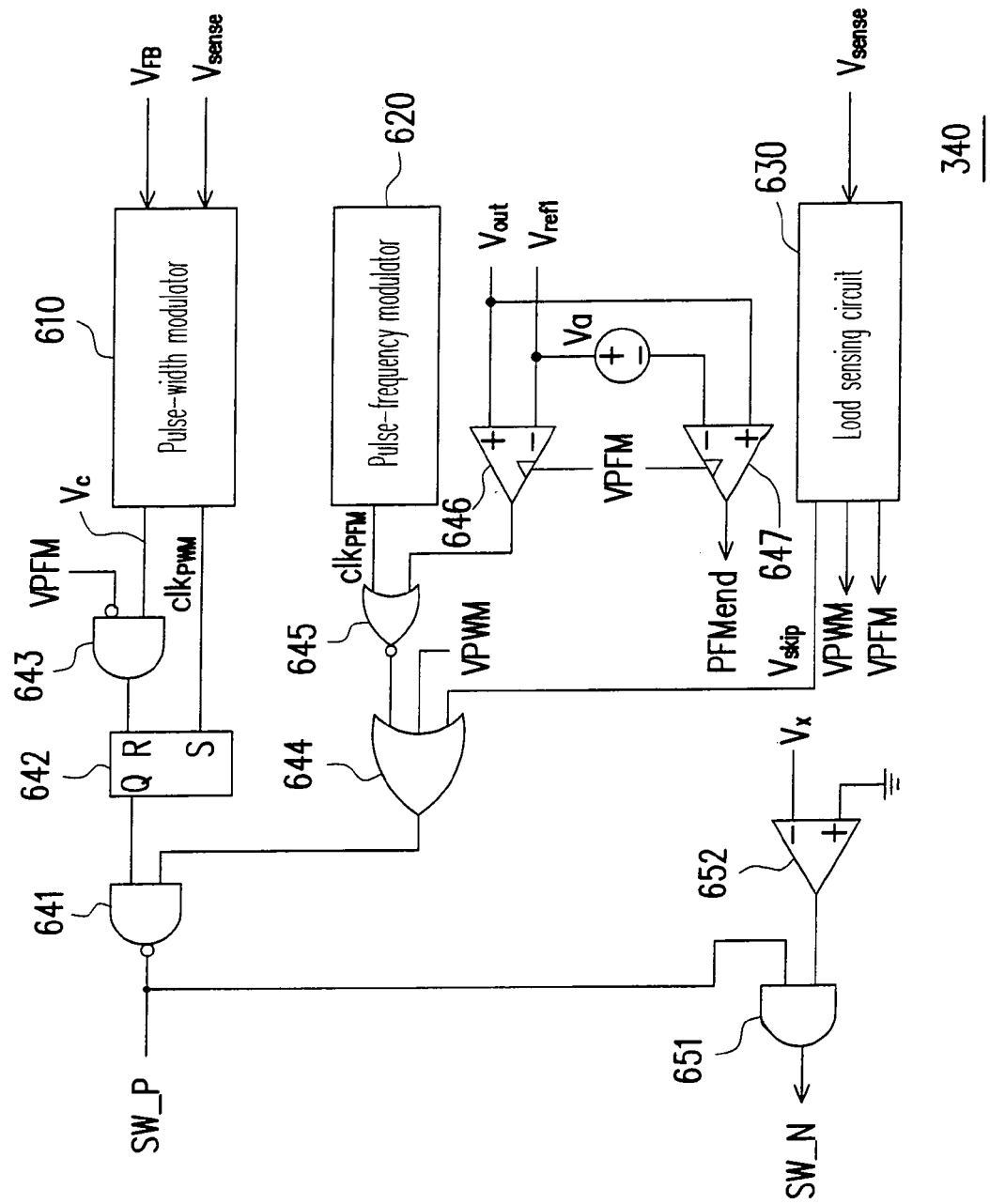
FIG. 6 is a circuit diagram of the control unit in FIG. 3 according to one embodiment of the present invention.

FIG. 6 is a circuit diagram of the control unit 340 in FIG. 3 according to one embodiment of the present invention. Referring to FIGS. 3 and 6 together, in the embodiment, the control unit comprises a pulse-width modulator 610, a pulse-frequency modulator 620, a load sensing circuit 630 and a select logic. The select logic comprises an NAND gate 641, an RS latch 642, an AND gate 643, an OR gate, an NOR gate 645 and a comparator 646.

Figure 7:
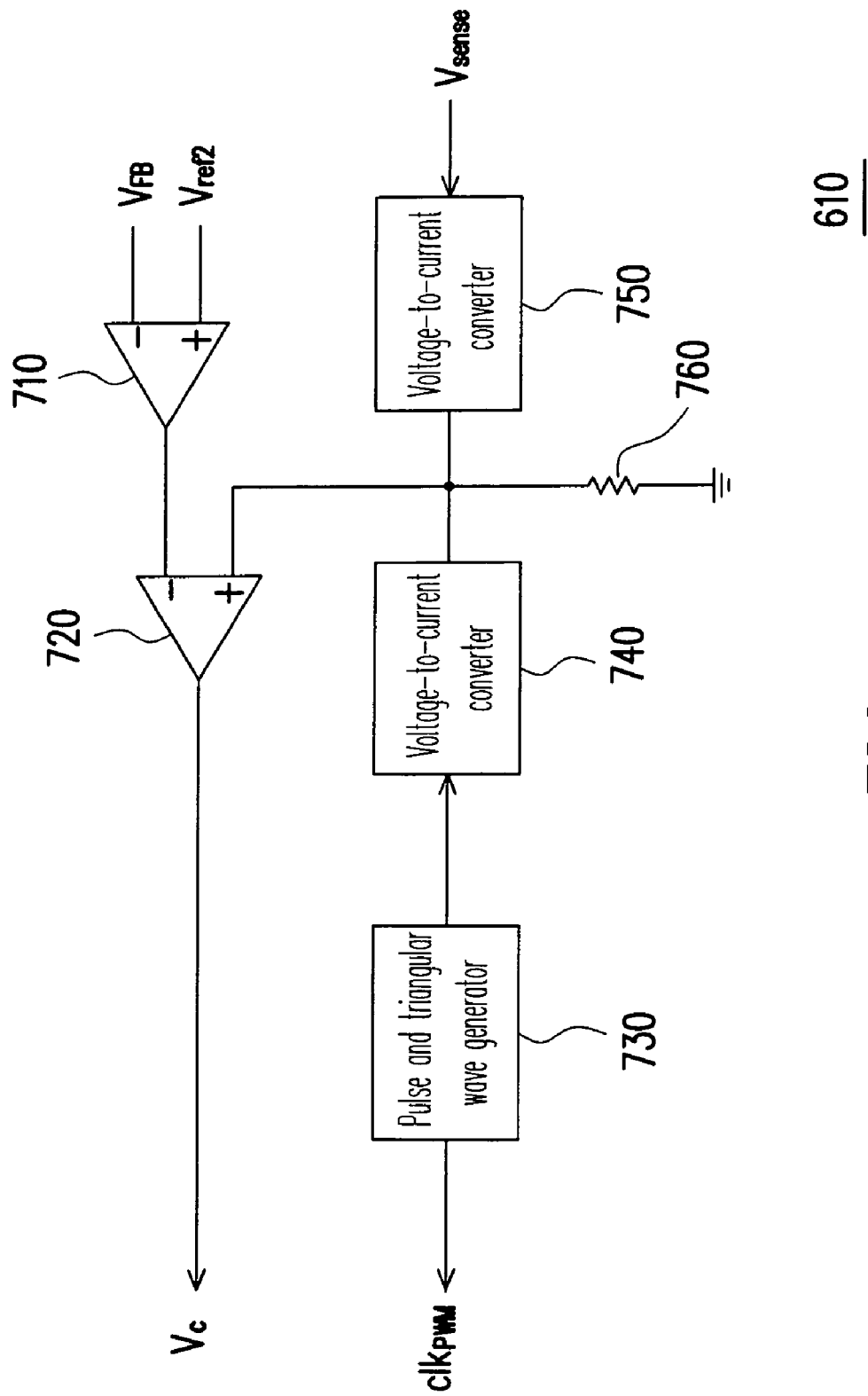
FIG. 7 is a circuit diagram of the pulse-width modulator in FIG. 6 according to one embodiment of the present invention.

The pulse-width modulator 610 generates and modulates the internal clock Vc in the manner of the pulse-width modulation according to the detection result output by the feedback unit 330, so as to provide a clock signal $clk_{PWM}$, wherein the detection result includes the voltage detection signal $V_{FB}$ and the current detection signal $V_{sense}$. FIG. 7 is a circuit diagram of the pulse-width modulator 610 in FIG. 6 according to one embodiment of the present invention. Referring to FIGS. 6 and 7 together, in the embodiment, the pulse-width modulator 610 comprises an error amplifier 710, a comparator 720, a clock and triangular wave generator 730, a resistor 760, and voltage-to-current converters 740 and 750. The detailed operation of the pulse-width modulator 610 described in FIG. 7 may refer to the Journal of Solid-State Circuit, Vol. 39, No. 1, page 3-14, so it will not be described herein any more. Those skilled in the art may realize the pulse-width modulator 610 with any type of pulse-width modulator as desired.

Referring to FIG. 6, the pulse-frequency modulator 620 generates and modulates a second internal clock $clk_{PFM}$ in the manner of the pulse-frequency modulation. Those skilled in the art may use any type of pulse-frequency modulator. The load sensing circuit 630 is electrically connected to the feedback unit 330 and samples the current detection signal $V_{sense}$ output by the feedback unit 330 every a preset cycle. The load sensing circuit 630 determines the output state of the power supply apparatus according to the sampling result of each time, and then outputs a mode selection signal according to the output state of the power supply apparatus, wherein in the embodiment, the mode selection signal includes signals VPWM and VPFM. The load sensing circuit 630 further outputs a skipping signal $V_{skip}$ according to the current detection signal $V_{sense}$ output by the feedback unit 330, wherein the skipping signal $V_{skip}$ may control the select logic to determine the skipping ratio of the internal clock Vc.

Figure 8:
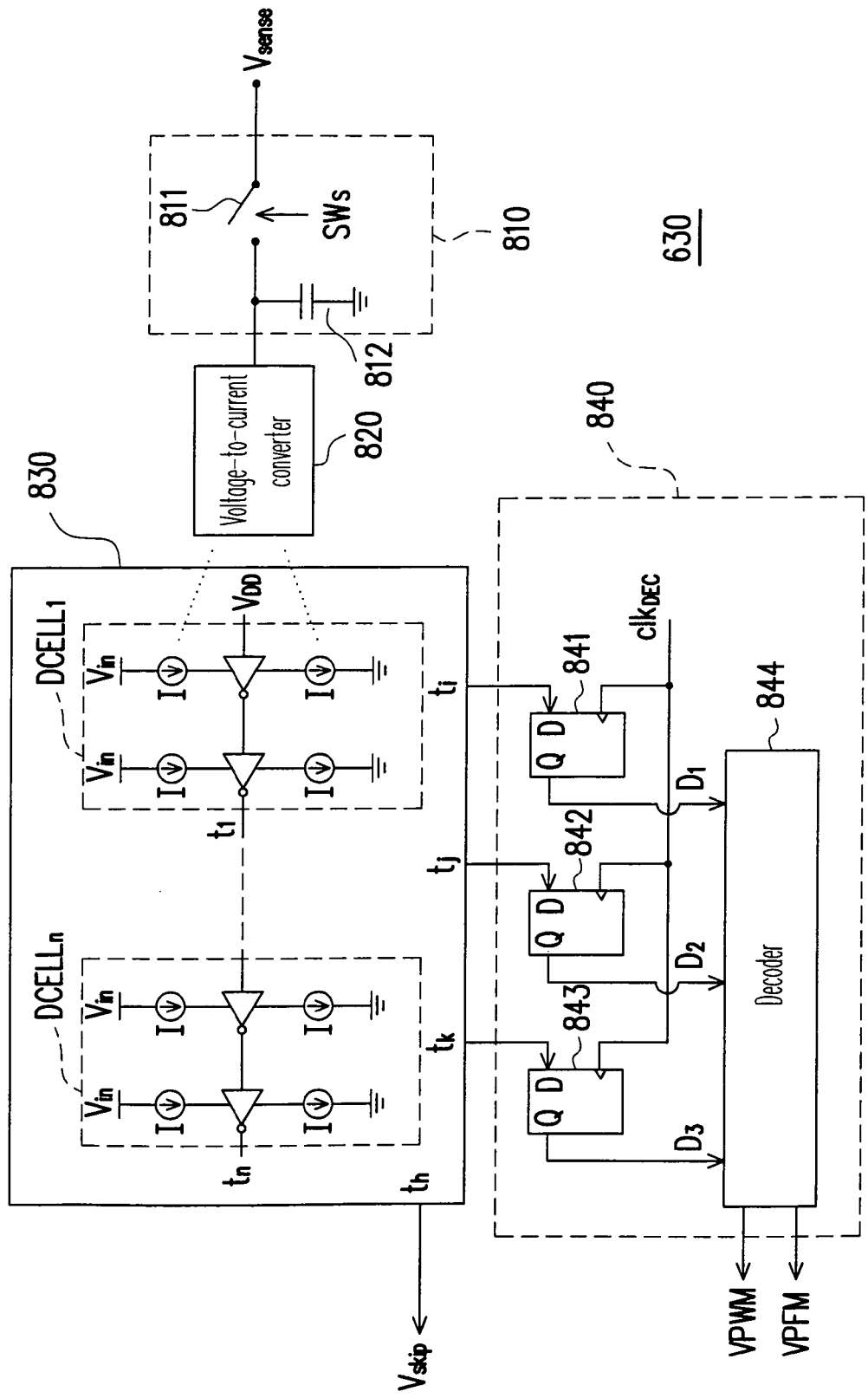
FIG. 8 is a circuit diagram of the load sensing circuit in FIG. 6 according to one embodiment of the present invention.
Figure 9:
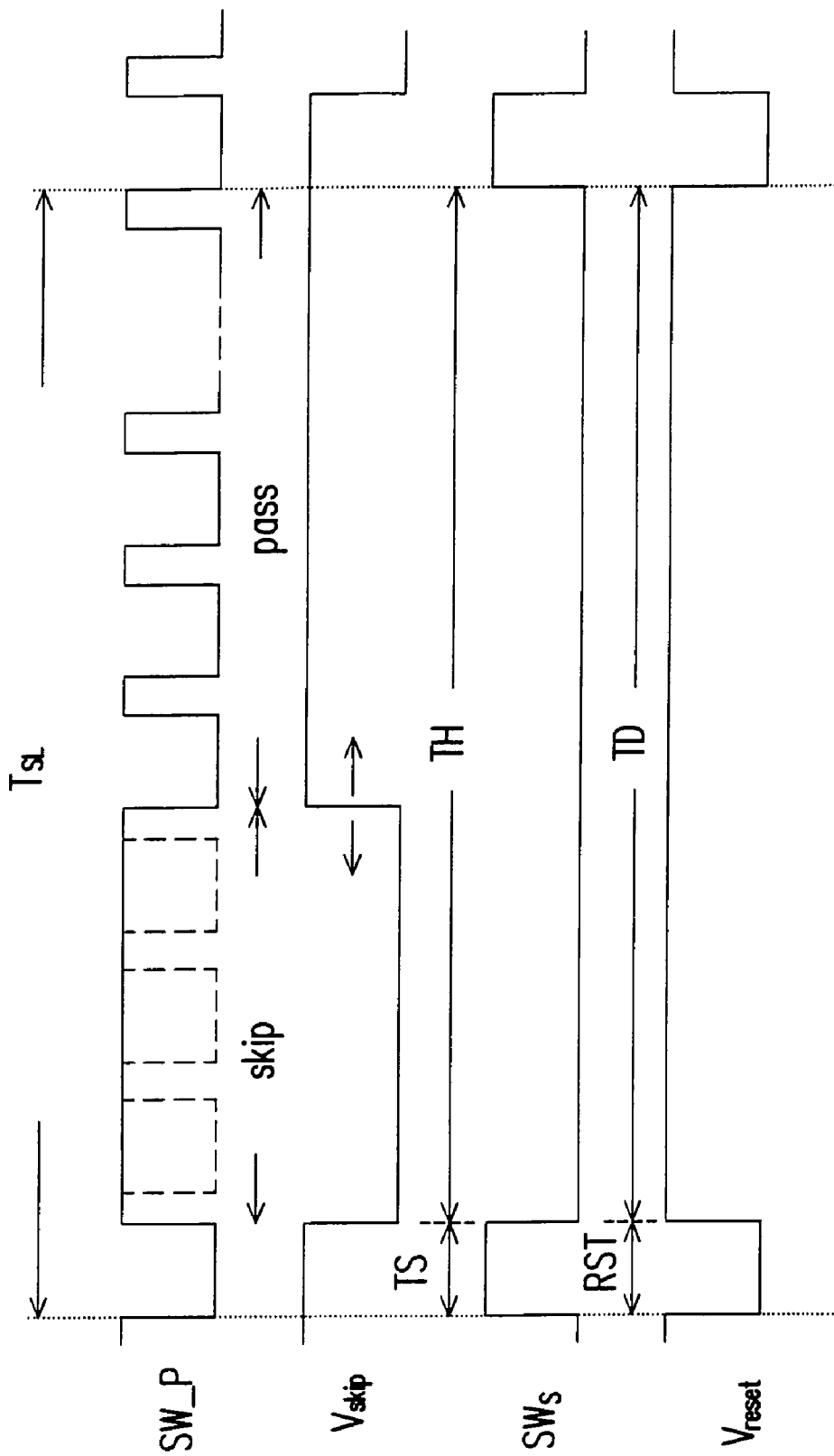
FIG. 9 is a timing diagram of relevant signals in FIGS. 6 and 8 according to one embodiment of the present invention.

FIG. 8 is a circuit diagram of the load sensing circuit 630 in FIG. 6 according to one embodiment of the present invention. FIG. 9 is a timing diagram of relevant signals in FIGS. 6 and 8 according to one embodiment of the present invention. In the embodiment, the load sensing circuit 630 may comprise a sampling unit 810, a voltage-to-current converter 820, a delay line 830 and a decode unit 840.

The sampling unit 810 is electrically connected to the feedback unit 330. Referring to FIGS. 6, 8 and 9 together, the sampling unit 810 comprises a sampling switch 811 and a sampling capacitor 812. The first end of the sampling switch 811 is electrically connected to the feedback unit 330 to receive the current detection signal $V_{sense}$, and the second end of the sampling switch 811 is electrically connected to the voltage-to-current converter 820 to be turned on during the first period TS and turned off during the second period TH. The first end of the sampling capacitor 812 is electrically connected to the second end of the sampling switch 811, and the second end of the sampling capacitor 812 is grounded. Therefore, the sampling unit 810 samples the current detection signal $V_{sense}$ and stores it in the sampling capacitor 812 every a determined cycle $T_{SL}$ according to the timing of a control signal $SW_S$.

The voltage-to-current converter 820 is electrically connected to the sampling unit 810 to convert the sampling result of the sampling unit 810 and output a conversion result. The delay line 830 is electrically connected to the voltage-to-current converter 820 and comprises n stages of delay cells $DCELL_1$-$DCELL_n$ connected with one another in series, wherein the delay time of each delay cell is determined by the conversion result of the voltage-to-current converter 820. During a delay period TD, a first level (here is the level of the voltage source $V_{in}$) is transferred among the delay cells $DCELL_1$-$DCELL_n$ step by step, and during a reset period RST, the output of the delay cells $DCELL_1$-$DCELL_n$ is reset to be a second level (here is a ground level). The decode unit 840 is electrically connected to the delay line 830 to sample at least one output from outputs $t_1$-$t_n$ of the delay cells $DCELL_1$-$DCELL_n$ according to the timing of the sampling clock $clk_{DEC}$, wherein the output signals $t_i$, $t_j$ and $t_k$ ($0<i, j, k \leq n$) are sampled here. Then, the decode unit 840 decodes the sampling result to generate the mode selection signals VPWM and VPFM. Additionally, the load sensing circuit 630 further uses the output signal $t_h$ (0<h≦n) of one of the delay cells DCELL$_1$-DCELL$_n$ as the skipping signal $V_{skip}$.

Figure 10:
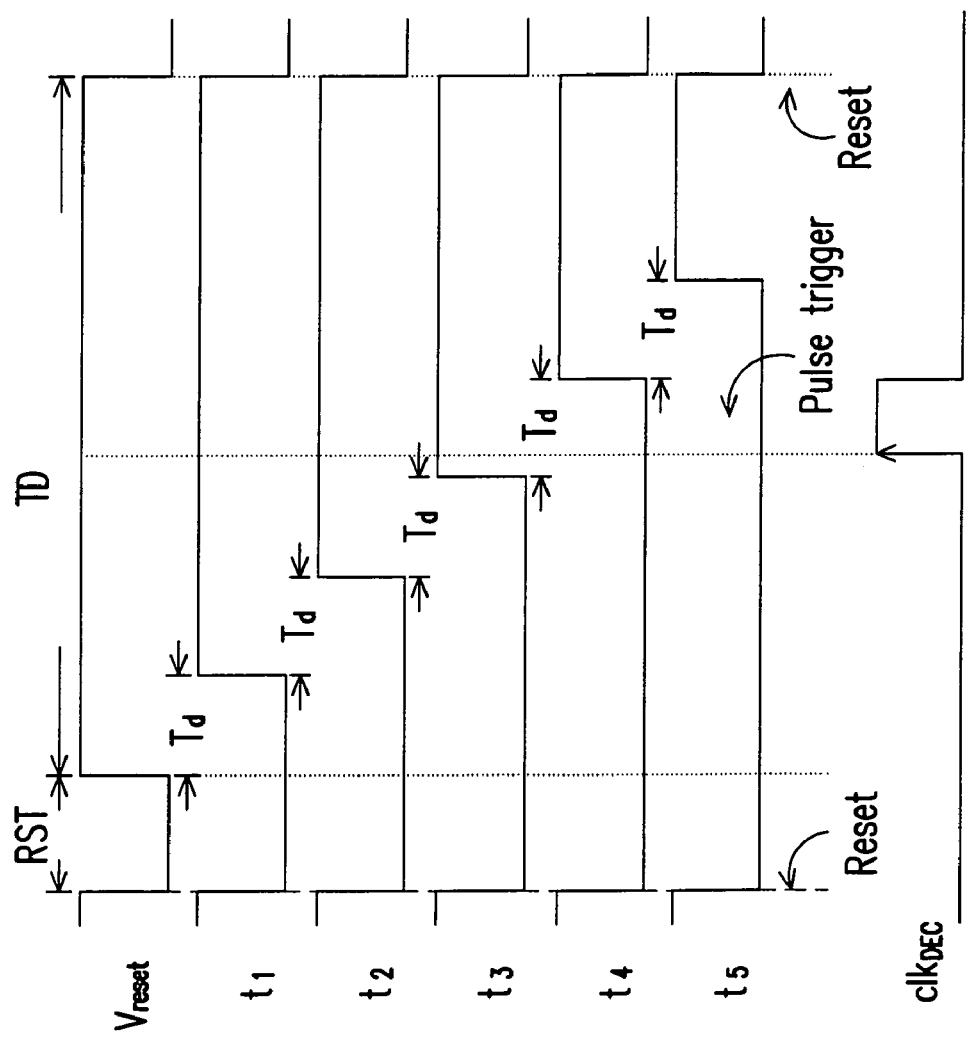
FIG. 10 is a timing diagram of latch signals of a decode unit in FIG. 8 according to one embodiment of the present invention.

FIG. 10 is a timing diagram of latch signals of a decode unit 840 in FIG. 8 according to one embodiment of the present invention. Referring to FIGS. 8 and 10, the delay time $T_d$ of each of the delay cells DCELL$_1$-DCELL$_n$ is determined by the conversion result of the voltage-to-current converter 820, wherein the conversion result is equivalent to the sampling result of the current detection signal $V_{sense}$. The decode unit 840 comprises at least one latch (here are three D-type flip-flops 841, 842 and 843) and a decoder 844. The latches 841, 842 and 843 latch the output signals $t_i$, $t_j$ and $t_k$, for example, $t_1$, $t_3$ and $t_5$, according to the triggering of the sampling clock clk$_{DEC}$. The decoder 844 is electrically connected to the latches 841, 842 and 843 to decode the latched contents of each latch, thereby generating the mode selection signals VPWM and VPFM.

Figure 11:
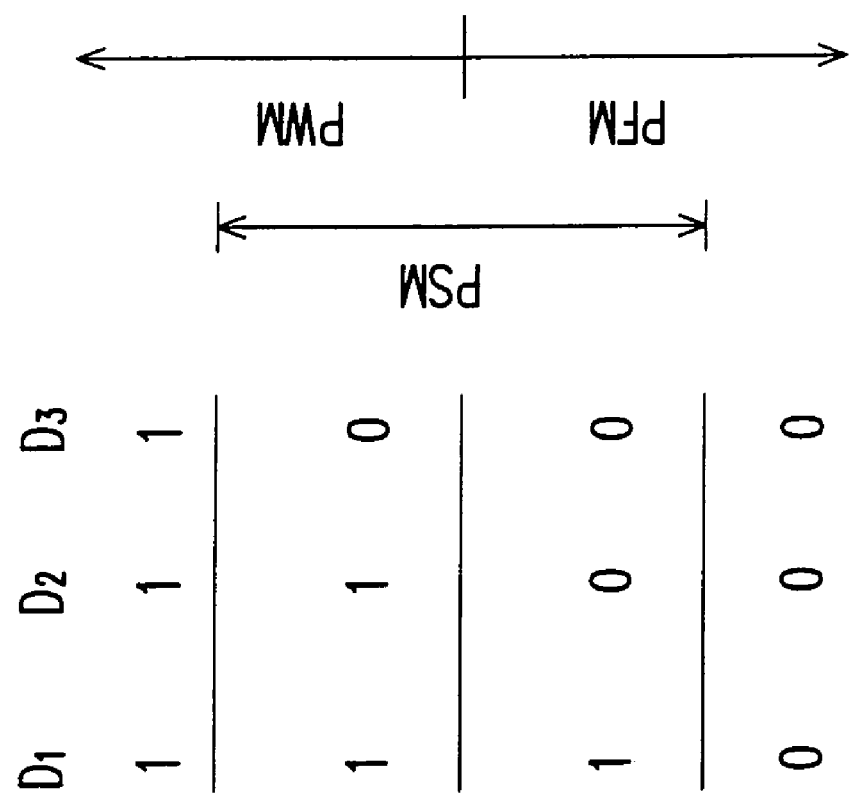
FIG. 11 is a truth table of the decode unit in FIG. 8 according to one embodiment of the present invention.

FIG. 11 is a truth table of the decode unit 840 in FIG. 8 according to one embodiment of the present invention. The load sensing circuit 630 converts a sensed load current into three-bit digital codes D1, D2 and D3, and outputs the mode selection signals VPWM and VPFM according to the truth table and the following Boolean algebraic expression.

$(VPWM)_i = D_1D_2D_3 + D_2(VPWM)_{i-1}$ $(VPFM)_i = PFMend(\overline{D}_1\overline{D}_2\overline{D}_3 + \overline{D}_2(VPFM)_{i-1})$, A segment of hysteretic fault-tolerant space exists between every two modes of the pulse-width modulation mode, the pulse-skipping mode and the pulse-frequency modulation mode, so as to avoid false action due to the disturbance of a noise when switching the mode. Therefore, if the mode selection signal VPWM=1 and VPFM=0, the control unit 340 is operated in the pulse-width modulation mode; if the mode selection signal VPWM=0 and VPFM=1, the control unit 3401 is operated in the pulse-frequency modulation mode; and if the mode selection signal VPWM=0 and VPFM=0, the control unit 340 is operated in the pulse-skipping mode. The operation will be described in detail below with reference to FIG. 6.

Figure 12:
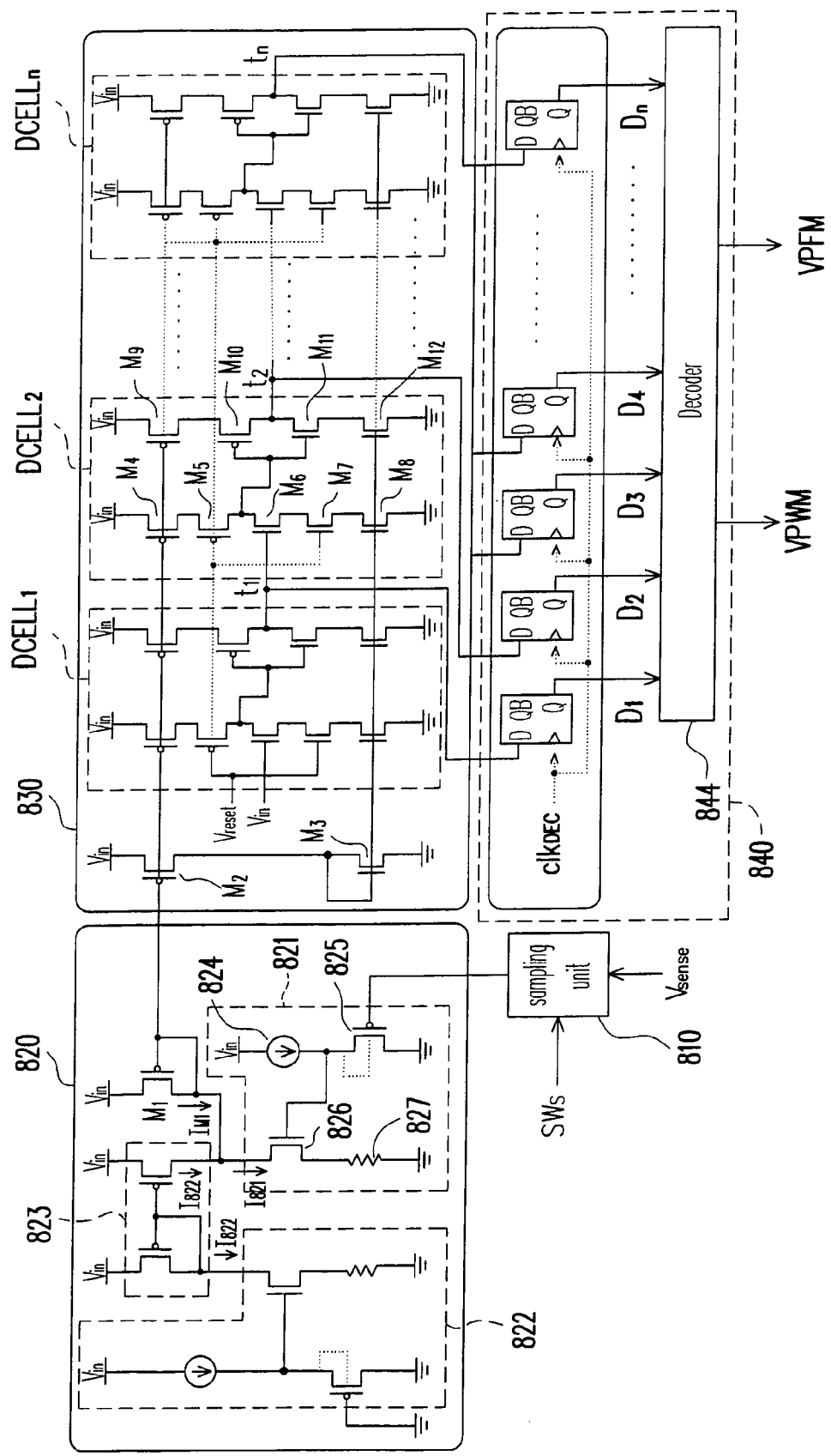
FIG. 12 is a detailed circuit diagram of a voltage-to-current converter and a delay line in FIG. 8 according to one embodiment of the present invention.

FIG. 12 is a detailed circuit diagram of a voltage-to-current converter 820 and a delay line 830 in FIG. 8 according to one embodiment of the present invention. The voltage-to-current converter 820 comprises a first voltage-to-current conversion cell 821, a second voltage-to-current conversion cell 822, a current mirror 823 and a first transistor M1. The input end of the first voltage-to-current conversion cell 821 is electrically connected to the sampling unit 810 to determine the current value of the output end according to the voltage at the input end. The input end of the second voltage-to-current conversion cell 822 is electrically connected to a preset voltage (here is a grounding voltage) to determine the current value of the output end according to the voltage at the input end. In the embodiment, the first voltage-to-current conversion cell 821 and the second voltage-to-current conversion cell 822 have the same circuit architecture. The first voltage-to-current conversion cell 821 comprises a current source 824, a first converting transistor 825, a second converting transistor 826 and a converting resistor 827. The first end of the current source 824 is electrically connected to the voltage source $V_{in}$. The gate of the transistor 825 acts as the input end of the first voltage-to-current conversion cell 821, the source thereof is electrically connected to the second end of the current source 824, and the drain thereof is grounded. The gate of the transistor 826 is electrically connected to the source of the transistor 825, and the drain of the transistor 826 acts as the output end of the first voltage-to-current conversion cell 821. The first end of the resistor 827 is electrically connected to the source of the transistor 826, and the second end of the resistor 827 is grounded.

The main current end of the current mirror 823 is electrically connected to the output end of the second voltage-to-current conversion cell 822 and the slave current end of the current mirror 823 is electrically connected to the output end of the first voltage-to-current conversion cell 821. The source of the transistor M1 is electrically connected to the voltage source $V_{in}$, and the gate and drain thereof are both electrically connected to the output end of the first voltage-to-current conversion cell 821. Since the first voltage-to-current conversion cell 821 and the second voltage-to-current conversion cell 822 both have the same circuit architecture, the output currents $I_{821}$ and $I_{822}$ both have the same temperature variation factor. The current $I_{M1}$ of the transistor M1 is equal to $I_{821}$-$I_{822}$. Since the temperature variation factors of the current $I_{821}$ and $I_{822}$ are counterweighed each other, the voltage-to-current converter 820 may supply the stable output current $I_{M1}$ without being influenced by the temperature, wherein the current $I_{M1}$ of the transistor M1 acts as the conversion result of the voltage-to-current converter 820. Since the current $I_{M1}$ is directly proportional to the gate voltage of the transistor M1, in the embodiment, the conversion result (the current $I_{M1}$) of the voltage-to-current converter 820 is transmitted to the delay line 830 through the gate voltage of the transistor M1.

The delay line 830 comprises a second transistor M2, a third transistor M3 and delay cells DCELL$_1$-DCELL$_n$. The gate of the transistor M2 is electrically connected to the gate of the transistor M1 to receive the conversion result of the voltage-to-current converter 820. The source of the transistor M2 is electrically connected to the voltage source $V_{in}$. The gate and drain of the transistor M3 are both electrically connected to the drain of the transistor M2, and the source of the transistor M3 is grounded. The delay cells DCELL$_1$-DCELL$_n$ are electrically connected to the gates of the transistors M2 and M3, so as to determine the delay time $T_d$ of the delay cells DCELL$_1$-DCELL$_n$ according to the gate levels of the transistors M2 and M3.

Herein, only the circuit of the delay cell DCELL$_2$ is illustrated in detail, and the other delay cells can be implemented by referring to the delay cell DCELL$_2$. The delay cell DCELL$_2$ comprises a fourth transistor M4, a fifth transistor M5, a sixth transistor M6, a seventh transistor M7, an eighth transistor M8, a ninth transistor M9, a tenth transistor M10, an eleventh transistor M11 and a twelfth transistor 12. The transistors M4, M5, M6, M7 and M8 are connected between the voltage sources $V_{in}$ and the ground in series, while the transistors M9, M10, M11 and M12 are connected between the voltage source $V_{in}$ and the ground in series. The gates of the transistors M4 and M9 are electrically connected to the gate of the transistor M2. The gates of the transistors M8 and M12 are electrically connected to the gate of the transistor M3. The gates of the transistors M5 and M7 receive a reset signal $V_{reset}$, wherein $V_{reset}=\overline{VPFM+SW_S}$.

The drain of the transistor M6 is electrically connected to the gates of the transistors M10 and M11, and the gate of the transistor M6 is electrically connected to the output $t_1$ of the previous stage of the delay cell (here is DCELL$_1$). The drains of the transistors M10 and M11 are the output $t_2$ of the delay cell DCELL$_2$. The transistors M5 and M7 are controlled by the reset signal $V_{reset}$, so the transistor M5 is turned off and the transistor M7 is turned on during the delay period TD, and the transistor M5 is turned on and the transistor M7 is turned off during the reset period RST.

In the embodiment of FIG. 12, the decode unit 840 comprises n latches, which latch the output signals $t_1$-$t_n$ according to the triggering of the sampling clock $clk_{DEC}$, and output the latched contents $D_1$-$D_n$ to the decoder 844. Therefore, in the embodiment, the decoder 844 may select a part of or all latched contents $D_1$-$D_n$ more flexibly to be decoded, thereby generating the mode selection signals VPWM and VPFM.

Referring to FIG. 6, the select logic is electrically connected to the load sensing circuit 630, the pulse-frequency modulator 620, the pulse-width modulator 610 and the power output unit 320. According to the mode selection signals VPWM and VPFM output by the load sensing circuit 630, the select logic selects to output the internal clock $V_c$ and the clock signal $clk_{PWM}$ provided by the pulse-width modulator as the driving signals SW_P and SW_N; or output the second internal clock $clk_{PFM}$ provided by the pulse-frequency modulator 620 as the driving signals SW_P and SW_N; or skip a part of the pulse of the clock signal output by the pulse-width modulator according to the skipping signal $V_{skip}$ (as shown in FIG. 9), and output the driving signals SW_P and SW_N according the clock signal which is partially skipped.

When the mode selection signal is VPWM=1 and VPFM=0, the AND gate 643 may transmit the internal clock $V_c$ output by the pulse-width modulator 610 to the latch 642. The latch 642 is triggered by the internal clock $V_c$ and the clock signal $clk_{PWM}$ to drive the NAND gate 641. Additionally, the comparators 646 and 647 are disabled due to the mode selection signal VPFM=0. At this point, the comparators 646 and 647 keep the output as "logic 1"; the OR gate 644 also keeps the output as "logic 1" due to the mode selection signal VPWM=1. Therefore, the NAND gate 641 outputs the output signal of the latch 642 as the driving signals SW_P and SW_N, and transmits them to the drivers 321 and 322, respectively. Therefore, at this point, the control unit 340 is operated in the pulse-width modulation mode.

When the mode selection signal is VPWM=0 and VPFM=1, the AND gate 643 is "disabled" and keeps the output as "logic 0". The latch 642 keeps its output as "logic 1" because the R input end thereof is kept as "logic 0". At this point, the comparators 646 and 647 are enabled by the mode selection signal VPFM. The comparator 646 compares a reference voltage $V_{ref1}$ with the output voltage $V_{out}$ of the power supply apparatus, so as to avoid overloading. The level difference of a voltage $V_a$ exists between the negative input end of the comparator 647 and the reference voltage $V_{ref1}$. Additionally, since the reset signal of the delay line 830 in the load sensing circuit 630 is $V_{reset}=\overline{VPFM+SW_S}$, the reset signal $V_{reset}$ is kept as "logic 0", i.e., all outputs (including the skipping signal $V_{skip}$) of the delay line 830 are kept as "logic 0". Therefore, the output signal of the NOR gate 645 is transmitted to the NAND gate 641 through the OR gate 644. The NAND gate 641 outputs the output signal of the NOR gate 645 as the driving signals SW_P and SW_N and transmits them to the drivers 321 and 322, respectively. Therefore, at this point, the control unit 340 is operated in the pulse-frequency mode.

Since the manner that the load sensing circuit 630 utilizes the delay line 830 to detect the load is not suitable in a discontinuous conduction mode (DCM) of the pulse-frequency modulation mode, an alternative design is provided by using the comparator 647. That is, the delay line 830 is used in the pulse-width modulation mode and the pulse-skipping mode, and the comparator 647 is used in the pulse-frequency modulation mode. Once the control unit 340 enters the pulse-frequency modulation mode, since the duty cycle of $CLK_{PFM}$ is fixed, the energy provided by the power supply apparatus is also fixed. When the load exceeds the upper limit value, the output voltage $V_{out}$ of the power supply apparatus is reduced. When $V_{out}<V_{ref1}-V_a$ due to the reduced voltage, the output PFMend of the comparator 647 is logic 0, which represents that the load has increased to the extent that the mode must be switched to PSM. According to the Boolean algebraic expression of the mode selection signals VPWM and VPFM:

$$(VPWM)_i = D_1 D_2 D_3 + D_2 (VPWM)_{i-1},$$

$$(VPFM)_i = PFMend(\overline{D}_1 \overline{D}_2 \overline{D}_3 + \overline{D}_2 (VPFM)_{i-1}),$$

the values of the mode selection signals VPWM and VPFM are both "logic 0", Such that the control unit 340 is changed to be operated in the pulse-skipping mode.

When the mode selection signal is VPWM=0 and VPFM=0, the AND gate 643 transmits the internal clock Vc output by the pulse-width modulator 610 to the latch 642. The latch 642 is triggered by the internal clock Vc and the clock signal $clk_{PWM}$ to drive the NAND gate 641. Additionally, the comparator 646 is disabled due to the mode selection signal VPFM=0 and keeps the output as "logic 1", such that the NOR gate 645 keeps the output as "logic 0". At this point, the OR gate 644 transmits the skipping signal $V_{skip}$ output by the delay line 830 in the load sensing circuit 630 to the NAND gate 641. When the skipping signal $V_{skip}$ is transited to be "logic 0", the NAND gate 641 "skips" a part of the pulse output by the latch 642 to keep the output as "logic 1". When the skipping signal $V_{skip}$ is transited to be "logic 1", the NAND gate 641 outputs the output signal of the latch 642 as the driving signals SW_P and SW_N. Therefore, the NAND gate 641 outputs the pulse-width modulation clock signal which is partially skipped as the driving signals SW_P and SW_N, and transmits them to the drivers 321 and 322 respectively. Therefore, the control unit 340 is operated in the pulse-skipping mode (referring to FIG. 3).

Referring to FIGS. 3 and 6, in order to prevent an inductive current with a negative value occurring at the drain (here is Vx) of the switch $M_P$, in the embodiment, the control unit 340 further comprises an AND gate 651 and a comparator 652. Due to the interactive switching between the two power transistors (the first switch $M_P$ and the second switch $M_N$), the inductive current has two slopes: (1) when the first switch $M_P$ is turned on, the slope of the inductive current is $(V_{in}-V_{out})/L$; (2) when the second switch $M_N$ is turned on, the slope of the inductive current is $-V_{out}/L$, wherein L represents the inductance of the inductor 323, so the inductive current is a triangular wave. Therefore, when the first switch $M_P$ is turned off and the second switch $M_N$ is turned on, the direction of the inductive current is durative, and the current still keeps the direction from $V_x$ to $V_{out}$, so as to release the energy stored in the inductor when the first switch $M_P$ is turned on and supply it to $V_{out}$. Accordingly, the value of the inductive current gradually decreases with the slope of "$-V_{out}/L$". When the current is 0 and then becomes negative, the direction of the current is changed from $V_{out}$ to $V_x$. In order to avoid such situation, the negative inductive current must be prevented from appearing, i.e., the second switch $M_N$ must be turned off when the inductive current becomes "0". At this point, the two power transistors are both turned off.

Therefore, the comparator 652 added in FIG. 6 aims to sense the situation that the inductive current becomes 0. When the first switch $M_P$ is turned off and the second switch $M_N$ is turned on, since the second switch $M_N$ is equivalent to a resistor when being turned on, the inductive current flows from $V_X$ to $V_{out}$ according to the slope $-Vout/L$. Therefore, the direction of the current of the second switch $M_N$ is from the source to the drain. Since the source of the second switch $M_N$ is grounded (0v), at the moment that the first switch $M_P$ is turned off and the second switch $M_N$ is turned on, the voltage of Vx is reduced from a voltage close to VDD to a negative voltage instantly. When the inductive current gradually decreases, the current flowing through a resistor equivalent to the second switch $M_N$ also gradually decreases, such that the cross-voltage between the source (ground) and the drain ($V_x$) of the second switch $M_N$ gradually reduces. When the inductive current is reduced to 0, the resistor equivalent to the second switch $M_N$ has no cross-voltage any longer, and at this point, the voltage of Vx rises from a negative value to 0. Therefore, whether $V_X$ is 0 or not can be sensed directly to sense the switching point that the inductive current is 0. Therefore, the comparator 652 receives the end voltage $V_x$ and compares it with the ground voltage (0 V), so as to input the comparison result to the AND gate 651. When the end voltage $V_x$ is a negative voltage, the comparator 652 outputs "logic 1", such that the AND gate 651 can output the driving signal SW_P of the NAND gate 641 as the driving signal SW_N. On the contrary, when the end voltage Vx is 0 V or a positive voltage, the comparator 652 outputs "logic 0", such that the AND gate 651 "skips" the output signal of the NAND gate 641 to output "logic 0" as the driving signal SW_N. Therefore, referring to FIG. 3, the second $M_N$ is driven by the driver 322 to be turned off.

However, those skilled in the art can modify the embodiment in accordance with the present invention. For example, those skilled in the art can replace the Boolean algebraic expression "(VPFM)$_i$=PFMend($\overline{D}_1\overline{D}_2\overline{D}_3+\overline{D}_2$ (VPFM)$_{i-1}$)" with "(VPFM)$_i$=PFMend($\overline{D}_1\overline{D}_2\overline{D}_3$+(VPFM)$_{i-1}$)."

In view of the above, since the voltage-regulating operation of the dynamic pulse-skipping mode is adopted in the present invention, and even the three voltage-regulating modes, namely, the pulse-skipping mode, the pulse-width modulation mode and the pulse-frequency modulation mode are integrated, the optimal conversion efficiency can be achieved in the whole load duration in any case. Additionally, the present invention further discloses the method of detecting the output condition by using the delay technology, thereby avoiding the disadvantage in the conventional art that unnecessary power is consumed on the series resistors.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A power supply apparatus for supplying an output voltage to a load, comprising:
    a power output unit, electrically connected to the load and used to adjust and supply the output voltage to the load according to at least one driving signal;
    a feedback unit, electrically connected to the power output unit and used to detect the output state of the power output unit and output a corresponding detection result; and
    a control unit, electrically connected to the feedback unit and the power output unit and used to skip a part of the pulse for an internal clock and select to output the skipped internal clock signal as the driving signal, wherein the control unit determines the skipping ratio for the internal clock according to the detection result output by the feedback unit, and the skipping ration is dynamically adjusted as the load is changed.

2. The power supply apparatus as claimed in claim 1, wherein the control unit further selects to output the un-skipped internal clock signal as the driving signal according to the detection result output by the feedback unit, wherein the control unit generates the internal clock signal through pulse-width modulation according to the detection result output by the feedback unit.

3. The power supply apparatus as claimed in claim 1, wherein the control unit further selects to output a second internal clock signal as the driving signal according to the detection result output by the feedback unit, wherein the control unit generates the second internal clock signal through pulse-frequency modulation according to the detection result output by the feedback unit.

4. The power supply apparatus as claimed in claim 1, wherein the control unit comprises:
    a pulse-width modulator, being electrically connected to the feedback unit and used to generate and modulate the internal clock signal through the pulse-width modulation according to the detection result output by the feedback unit;
    a pulse-frequency modulator, used to generate and modulate a second internal clock signal through the pulse-frequency modulation;
    a load sensing circuit, being electrically connected to the feedback unit and used to sample the detection result output by the feedback unit for each preset time period, determine the output state of the power supply apparatus according to each sampling result, and then output a mode selection signal according to the output state of the power supply apparatus, wherein the load sensing circuit determines the skipping ratio for the internal clock signal according to the detection result output by the feedback unit, so as to output a skipping signal; and
    a select logic, being electrically connected to the load sensing circuit, the pulse-frequency modulator, the pulse-width modulator and the power output unit, wherein according to the mode selection signal output by the load sensing circuit, the select logic selects to:
        output the driving signal according to the internal clock signal provided by the pulse-width modulator;
        output the driving signal according to the internal clock signal with a part of pulse having been skipped, wherein the part of pulse for the internal clock signal is skipped according to the skipping signal; or
        output the driving signal according to the second internal clock signal provided by the pulse-frequency modulator.

5. The power supply apparatus as claimed in claim 4, wherein the load sensing circuit comprises:
    a sampling unit, being electrically connected to the feedback unit and used to sample the detection result output by the feedback unit for each preset time period;
    a voltage-to-current converter, being electrically connected to the sampling unit and used to convert a sampling result of the sampling unit and output a conversion result;
    a delay line, being electrically connected to the voltage-to-current converter, and comprising n stages of serial-connected delay cells DCELL$_x$ used to transfer a first level among the delay cells DCELL$_1$-DCELL$_n$ stage by stage according to the conversion result of the voltage-to-current during a delay period, and used to reset the output of the delay cells to be a second level during a reset period, wherein $DCELL_x$ means the $x^{th}$ delay cell, wherein $0 < x \leq n$; and a decode unit, being electrically connected to the delay line and used to sample at least one of the outputs of the delay cells $DCELL_1$-$DCELL_n$ and decode the output to generate the mode selection signal;

wherein the load sensing circuit further takes the output of one of the delay cells $DCELL_x$ as the skipping signal.

6. The power supply apparatus as claimed in claim 5, wherein the sampling unit comprises:

a sampling switch, with a first end being electrically connected to the feedback unit and with a second end being electrically connected to the voltage-to-current converter, wherein the sampling switch is turned on during a first period and turned off during a second period; and a sampling capacitor, with a first end being electrically connected to the second end of the sampling switch and with a second end being grounded.

7. The power supply apparatus as claimed in claim 5, wherein the voltage-to-current converter comprises:

a first voltage-to-current conversion cell, with an input end being electrically connected to the sampling unit to determine the current value of an output end according to the voltage at the input end;

a second voltage-to-current conversion cell, with an input end being electrically connected to a preset voltage to determine the current value of an output end according to the voltage at the input end;

a current mirror, with the master current end being electrically connected to the output end of the second voltage-to-current converter and with the slave current end being electrically connected to the output end of the first voltage-to-current conversion cell; and a first transistor, with the source being electrically connected to a voltage source and with the gate and the drain both being electrically to the output end of the first voltage-to-current conversion cell, wherein the current of the first transistor acts as the conversion result for the voltage-to-current converter.

8. The power supply apparatus as claimed in claim 7, wherein the first voltage-to-current conversion cell and the second voltage-to-current conversion cell both have the same circuit architecture.

9. The power supply apparatus as claimed in claim 7, wherein the first voltage-to-current conversion cell comprises:

a current source;

a first converting transistor, with the gate as the input end of the first voltage-to-current conversion cell, with the first source/drain being electrically connected to the current source, and with the second source/drain being grounded;

a second converting transistor, with the gate being electrically connected to the first source/drain of the first converting transistor and with the first source/drain as the output end of the first voltage-to-current conversion cell; and a converting resistor, with the first end being connected to the second source/drain of the second converting transistor and with the second end being grounded.

10. The power supply apparatus as claimed in claim 5, wherein the delay line further comprises:

a second transistor, with the gate receiving the conversion result of the voltage-to-current converter and with the source being electrically connected to a voltage source; and a third transistor, with the gate and the drain being both electrically connected to the drain of the second transistor and with the source being grounded;

wherein the delay cells $DCELL_1$-$DCELL_n$ are further electrically connected to the gates of the second transistor and the third transistor, so as to determine the delay time of the delay cells according to the gate level of the second transistor and the third transistor.

11. The power supply apparatus as claimed in claim 10, wherein the delay cell $DCELL_x$ comprises:

a fourth transistor, with the source being electrically connected to the voltage source and with the gate being electrically connected to the gate of the second transistor;

a fifth transistor, with the source being electrically connected to the drain of the fourth transistor and with the gate receiving a reset signal;

a sixth transistor, with the drain being electrically connected to the drain of the fifth transistor and with the gate being electrically connected to the output of the previous stage of the delay cell $DCELL_{x-1}$;

a seventh transistor, with the drain being electrically connected to the source of the sixth transistor and with the gate receiving the reset signal;

an eighth transistor, with the drain being electrically connected to the source of the seventh transistor, with the gate being electrically connected to the gate of the third transistor, and with the source being grounded;

a ninth transistor, with the source being electrically connected to the voltage source and with the gate being electrically connected to the gate of the second transistor;

a tenth transistor, with the source being electrically connected to the drain of the ninth transistor and with the gate being electrically connected to the drain of the fifth transistor, wherein the drain of the tenth transistor is the output of the delay cell $DCELL_x$;

an eleventh transistor, with the drain being electrically connected to the drain of the tenth transistor and with the gate being electrically connected to the drain of the fifth transistor; and a twelfth transistor, with the drain being electrically connected to the source of the eleventh transistor, with the gate being electrically connected to the gate of the third transistor and with the source being grounded;

wherein the fifth transistor and the seventh transistor are under the control of the reset signal, and during the delay period, the fifth transistor is turned off and the seventh transistor is turned on, and during the reset period, the fifth transistor is turned on and the seventh transistor is turned off.

12. The power supply apparatus as claimed in claim 5, wherein the decode unit comprises:

at least one latch, being electrically connected to a corresponding delay cell $DCELL_y$ in the delay line and used to latch the output of the delay cell $DCELL_y$, wherein $0 < y \leq n$; and a decoder, being electrically connected to the latch and used to decode the latched content of the latch, thereby generating the mode selection signal.

13. The power supply apparatus as claimed in claim 1, wherein the power output unit comprises a buck converter.

14. The power supply apparatus as claimed in claim 13, wherein the buck converter comprises:

a first switch, with the control end being controlled by the control unit and with the first end being electrically connected to a voltage source;

a second switch, with the control end being controlled by the control unit, with the first end being electrically connected to the second end of the first switch, and with the second end being grounded;

an induction coil, with the first end being electrically connected to the second end of the first switch and with the second end used for outputting the output voltage; and a load capacitor, with the first end being electrically connected to the second end of the induction coil and with the second end being grounded.

15. The power supply apparatus as claimed in claim 14, wherein the induction coil is an inductor.

16. The power supply apparatus as claimed in claim 1, wherein the feedback unit comprises:

an operational amplifier, having a first input end, a second input end, and an output end;

an NOT gate, with the input end being electrically connected to the control end of the first switch;

a thirteenth transistor, with the gate being electrically connected to the control end of the first switch, with the first source/drain being electrically connected to the second end of the first switch and with the second source/drain being electrically connected to the first input end of the operational amplifier;

a fourteenth transistor, with the gate being electrically connected to the output end of the NOT gate, with the first source/drain being electrically connected to the voltage source and with the second source/drain being electrically connected to the second source/drain of the thirteenth transistor;

a fifteenth transistor, with the first source/drain being electrically connected to the voltage source, with the gate being grounded and with the second source/drain being electrically connected to the second input end of the operational amplifier;

a sixteenth transistor, with the first source/drain being electrically connected to the second source/drain of the fifteenth transistor, with the gate being electrically connected to the output end of the operational amplifier, wherein the level of the second source/drain of the sixteenth transistor is the corresponding detection result output by the feedback unit; and a first resistor, with the first end being electrically connected to the second source/drain of the sixteenth transistor and with the second end being grounded.

17. The power supply apparatus as claimed in claim 1, wherein the feedback unit comprises:

a second resistor, with the first end being electrically connected to the output of the power output unit, wherein the level of the second end of the second resistor is the corresponding detection result output by the feedback unit; and a third resistor, with the first end being electrically connected to the second end of the second resistor and with the second end being grounded.

* * * * *